Feb. 19, 1924.

F. H. HOPKINS

PRESSURE GAUGE

Filed Oct. 3, 1921

1,484,068

INVENTOR
Frank H. Hopkins
by Wright, Brown, Quinby & Tray
Att'ys

Patented Feb. 19, 1924.

1,484,068

UNITED STATES PATENT OFFICE.

FRANK H. HOPKINS, OF SOMERVILLE, MASSACHUSETTS, ASSIGNOR, BY MESNE ASSIGNMENTS, TO AMERICAN SCHAEFFER & BUDENBERG CORPORATION, OF BROOKLYN, NEW YORK, A CORPORATION OF NEW YORK.

PRESSURE GAUGE.

Application filed October 3, 1921. Serial No. 504,836.

*To all whom it may concern:*

Be it known that I, FRANK H. HOPKINS, a citizen of the United States, residing at Somerville, in the county of Middlesex and State of Massachusetts, have invented new and useful Improvements in Pressure Gauges, of which the following is a specification.

The present invention relates to pressure gauges of the Bourdon type, characteristics of which are a curved spring tube of flattened cross section generally called simply a "spring;" which is distorted and flexed by variations in the pressure difference between the contained fluid and the external atmosphere, and a mechanical movement coupled to such tube and adapted to transmit enlarged motion to a hand or other indicator; all contained within a case, usually circular in outline, in which is mounted a dial or record chart cooperative with the indicator. Such gauges are produced in a large variety of classes for measuring different ranges and intensities of pressure, below as well as above the atmospheric pressure, with single or double spring tubes. The differences between gauges of these various classes, so far as they concern the present invention, consist in different sizes of cases and movements, and different lengths and diameters of spring tubes for the several sizes of gauge. Besides these major differences, there are minor individual differences between spring tubes intended to be exactly alike for gauges of the same class but differing from one another on account of the practical impossibility, either of securing exact uniformity in the thickness and elastic quality of the metal walls of the tube, or of flattening or bending the tubes to exactly the same degree.

Customarily the gauge movements are separately made as self-contained units, each having its own frame, and the cases are separately prepared with tapped holes to receive the screws by which the movements are secured in them; the cases and movements being subsequently assembled by persons other than those employed for making and preparing them. Usually two screws are used for the purpose of mounting the movement. Heretofore the practice has been to locate the holes in the cases for each class of gauge in special position according to the length of the spring to be applied in the gauges of that particular class; and to compensate for individual variations between springs produced for each class of gauge by providing coupling links of respectively different lengths to make connection between the movement and the spring tube. In a factory making a large series of gauges, this has made necessary the provision of a great number of different cases, and on the part of the assembling operative has compelled the expenditure of time in selecting coupling links of special length suitable to the special needs of each individual gauge. If the stock of cases at hand of a particular class should not be adequate to fill an order, cases of another class could not be adapted to the purpose without special preparation, causing increased expense. Then the time required to select coupling links as above described is a further cause of expense. Since the part of the movement to which the coupling link is connected is an arm, rotatable about an axis, the provision of a longer or shorter link to accommodate a shorter or longer spring, respectively, causes a difference in the angle between the coupling links and arms of gauges of the same class, and results in appreciable variations between the indications given by such individual gauges in like circumstances.

Although an attempt has heretofore been made to compensate for minor variations in the length of spring tubes of the same class, the means employed for that purpose have permitted of only the most limited range of adjustment. Such adjustment as was effected was made at the expense of accuracy.

The usual location of the screws for attaching the movement to the case has heretofore been at the ends of the frame near the posts which connect the top and bottom plates of the frame. It frequently happens that either that plate of the frame movement which lies against the back wall of the case, or the abutting surface of the case itself, is not in a true plane, and when that occurs such distortion is frequently given to the frame in securing it to the case that the staff carrying the indicator does not turn freely in its bearings, but sticks and so causes inaccuracy by resisting the resilient distortion of the spring tube and lagging behind the pressure change being indicated. The customary method of mounting the movement in the case is to pass the screws through holes provided for them in the bottom plate of the movement frame into the tapped holes in the case, which is an operation of some delicacy and liable to be of uncertain time because of the liability of the screws to fall out of place before their threads have been engaged with the threads of the holes.

Some forms of gauge are provided with what is called a "suspended movement", in which the movement is mounted on a web extending from the socket to which one end of the spring tube is attached, although in general the movement is applied directly to the back wall of the case. All that has been said heretofore applies equally to the suspended movement type as well as to the other.

The objects of this invention are first to enable the movements and cases of each size to be assembled with one another and with spring tubes varying greatly in length to produce gauges of different classes, without requiring special preparation of the case for each separate class, and with coupling links of the same length in all gauges of the same size; second, to permit a wide range of angular adjustment of the movement in the case and to compel such adjustment to take place about the axis on which the indicator turns; third, to avoid and overcome the conditions which have heretofore caused the indicator carrying staff to bind or stick in the movement frame; and fourth to facilitate the assembling and mounting of the movement in the case. The manner in which these objects are accomplished and the principles and means in which the invention essentially consists are explained in the following specification with reference to the drawings.

In the drawings,—

Like reference characters designate the same parts in all the figures.

Figure 1:
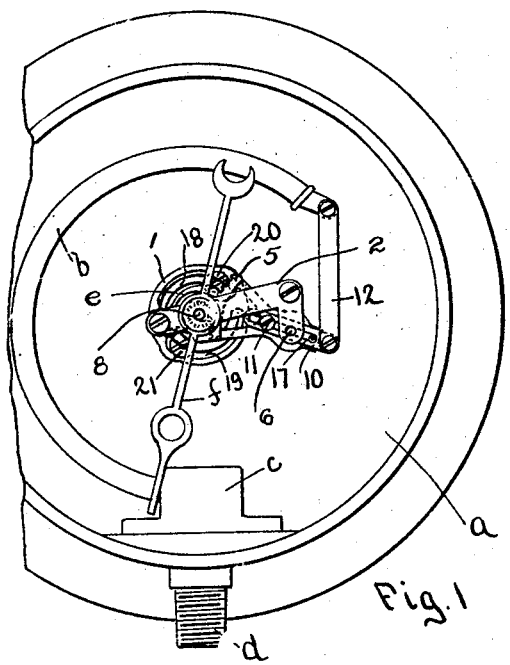
Figure 1 is a face view of a gauge with the crystal and dial removed to show the operating parts in which the new features of the invention particularly reside.

$a$ represents the case of the gauge, $b$ the curved spring tube of the familiar Bourdon type, and $c$ the socket to which the entrance end of the spring tube is made fast and from which extends an external nipple $d$ for connection with a pipe containing fluid of which the pressure is to be measured. The letter $e$ designates as a whole the self-contained movement which is coupled to the movable end of the spring tube and transmits motion wth multiplication to a hand $f$ or equivalent indicator. The particular movement here shown is in principle, and except for the features novel with this invention and later described, a common and familiar one having a frame composed of a bottom plate 1, a top plate 2 and posts 3 and 4; a gear segment 5 on the staff 6 and a pinion 7, attached to the staff 8 which carries the indicator, and in mesh with the gear segment. A hairspring 9 is fastened to the staff 8 and to the post 3, and a slotted bar 10 embracing the staff 6 and fastened to the segment 5 by a screw 11 provides an adjustable arm to which the coupling member 12 connecting the movement with the spring tube may be attached.

Figure 2:
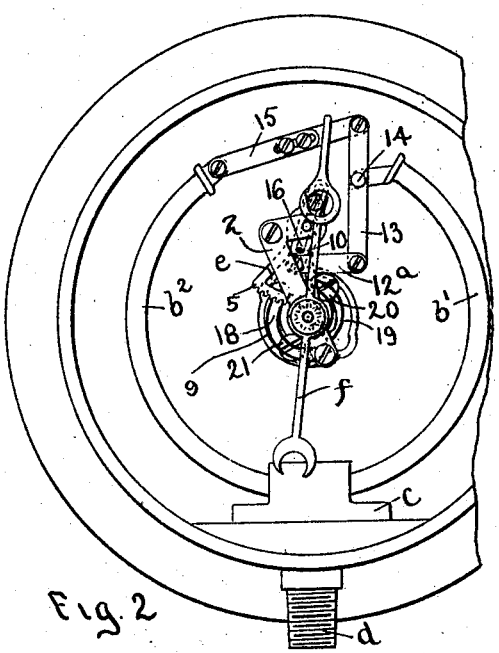
Figure 2 is a similar view of a specifically different class of gauge, in which the same case and the same movement as shown in Figure 1 are employed in a different relation to one another.

In Figure 1, which shows a single spring gauge, the coupling member 12 is a link pivoted at its opposite ends to the spring tube and to the bar 10, respectively, while in Figure 2, which shows a double spring gauge, the equivalent coupling member $12^a$ is pivoted to a rocker 13 which is fulcrumed at 14 to one of the spring tubes $b^1$ and is connected by a link 15 to the other of the tubes, $b^2$. Holes 16 (Figure 2) and 17 (Figure 1) are provided in the segment at opposite sides of the staff 6 for reception of the screw 11, whereby it is possible to place the bar with that end which is pivoted to the coupling at either side of the staff 6 and at various distances from such staff.

It will be noted by comparing Figures 1 and 2 that the position of the movement is relatively different in these two classes of gauge, and it will be appreciated that with still other classes of gauge having, respectively, longer or shorter spring tubes, either double or single, the movement may be required to assume still other positions, and also larger or smaller movements may be needed. By this invention I have made it possible to accommodate the same movement in the same case to spring tubes of all these different lengths without changing the length of the link 12, in a single spring gauge, or the link $12^a$ in the double spring gauge, or the angle of either link with that arm of the gear segment to which it is connected, whatever may be the length of the spring; and at the same time I have made the movement adjustable angularly about the axis of the staff 8, which is the axis of rotation of the indicator *f*.

In that form of the invention shown in Figures 1 to 4 inclusive, the bottom plate 1 is provided with two slots 18 and 19, both concentric with the staff 8 and of the same radius, the plate being made with sufficient width surrounding the staff to accommodate these slots. Screws 20 and 21 mounted in the back wall $a^1$ of the case and passing through the slots 18 and 19, respectively, permit the movement to be adjusted around this axis. Their heads overlap the rims of the slots whereby the movement is made fast when the screws are driven tight. Preferably the screws are at diametrically opposite sides of the staff, and the slots are enlarged at points diametrically opposite to one another sufficiently to enable the screw heads to pass through such enlarged parts. Preferably, also, the enlargements are at one end of each slot, although they may be provided in other locations if desired.

In order to position the staff at an exact point in the case and maintain it in the same position, however the whole movement may be adjusted, a swivel or pivot connection is made between the movement and the back wall. Most conveniently such engagement is provided by an extension of the bushing 22, in which the staff 8 has its bearing in the bottom plate 1, below or to the rear of said plate, and by a socket or recess $a^2$ of complemental diameter in the back wall $a^1$. Other specific forms of swivel may, however, be made equivalent to that here described and such are included within my claims to protection for this feature of the invention. The one described is preferred to others on account of its simplicity and low cost. This swivel connection provides a positioning means additional to the screws and is adequate together with one only of the screws, to secure the movement in place, but two screws are preferred on account of their greater security.

Figure 3:
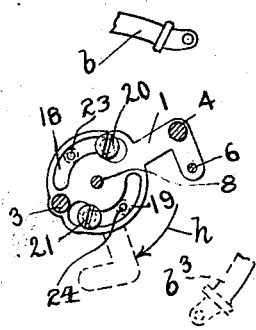
Figure 3 is a detail view showing the frame of the movement in two of its possible positions.

With the attaching screws arranged as in Figure 3, with the screw 20 occupying the slot 18 and screw 21 occupying slot 19, the movement may be adjusted in the sector where the arrow *h* is applied between the full line and dotted line positions of the movement plate 1, so as to accommodate single springs of any length between that shown at *b* in full lines and that shown in dotted lines at $b^3$. Then by removing the movement and reengaging it, with the screw 20 passed through the slot 19 and the screw 21 through the slot 18, the movement may be adjusted in the sector denoted by the arrow *i* to accommodate double spring gauges in which the length of the spring tubes may vary from that shown in full lines at $b^2$ to that shown in dotted lines at $b^4$. Furthermore, I contemplate providing alternative holes 23 and 24 on opposite sides of the staff 8, and equally spaced between the illustrated positions of the screws, into which the latter may be transferred in order to permit of similar adjustment of the movement plate in two other sectors. Thereby the movement may be assembled with a spring of any length in any case of suitable diameter and depth.

Among the useful results obtained by the invention as just described are included these. Any case of a given size may be assembled with a movement of a suitable size and a spring tube of any length without special preparation. No time need be lost, prior to assembling, in forming special screw holes to accommodate the movement to a particular length of spring or in selecting a case specially prepared for a given class of gauge to receive the movement and spring of that class, or in selecting a coupling link 12 or $12^a$ of special length to compensate for inevitable variations in different gauges between the distance of the end of the spring from the movement. Instead, the assembling operative may take the cases and movements as they come, set the clamping screws 20 and 21 loosely in the case before mounting the movement, lay the movement in place by passing the enlargements of the slots 18 and 19 over the heads of the screws, connect a link of standard length to the spring tube and the arm 10, meanwhile turning the movement until it is brought to the proper adjustment to receive the pivot screw, and finally tighten the clamping screws. Thus the assembling may be carried out in the minimum time, which is a substantial item of saving in a large factory. The enlargements of the slots to admit the screw heads contribute to this time saving, for their presence avoids the annoyance and impediment to the placement of the screws caused by the hairspring when the screws are inserted through the slots into the receiving holes. They can be placed much more quickly and surely when they are loosely placed in their holes before the movement is applied. Still more, these enlargements aid in the removal of a defective movement and the substitution of a new one in an already installed gauge.

In addition to the saving in the cost of manufacture, the invention results in uniformity in the angularity of the connecting link to the segment arm in all gauges where the size of movement and the radius of curvature of the spring tube are alike, thus giving uniform accuracy, so far as angularity of the connecting link influences accuracy. Practically unlimited angular adjustment of the movement is permitted, and as the center about which this adjustment takes place is fixed, it does not alter the relation of the indicator to the dial, which is mounted independently of the movement frame on the case. As the attaching screws are, in any adjustment, relatively far removed from the line connecting the posts 3 and 4 of the movement instead of being substantially in that line and close to the posts, danger of so warping the frame as to cause the movement to stick is largely avoided. If the bottom plate and the gauge wall should not match truly, whatever distortion would be given to the movement by tightening the screws would take place locally in the lateral enlargements of the bottom plate and would not cause the center staff to stick.

The same principles and advantages hereinbefore explained apply to gauges of the suspended movement type as well as to those in which the movement is applied and secured directly to the rear wall of the case. As to such suspended movement gauges, the web on which the movement is mounted is equivalent to the back wall of the case and is included within the meaning of the term "back wall" or terms of similar import used in the appended claims.

Figure 6:
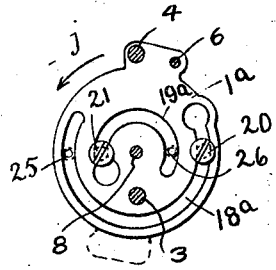
Figures 6 and 7 are views similar in principle to Figures 3 and 4 illustrating modifications of the invention.
Figure 4:
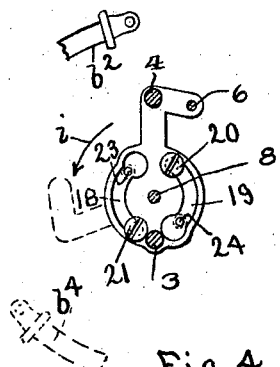
Figure 4 is a similar view of the movement frame showing two other possible positions.

A modification is shown in Figure 6, the purpose and effect of which is to obtain a wider range of angular adjustment without changing the relation of the separate attaching screws and slots. The bottom plate 1ª is here made with a relatively larger circular part and is provided with slots 18ª and 19ª which are of respectively different radii and of such length that their ends overlap. Thus without changing the screws, the movement may be adjusted through more that one half a revolution. But by shifting the screws into other holes 25 and 26 the adjustment may be carried on to a full revolution.

Figure 7:
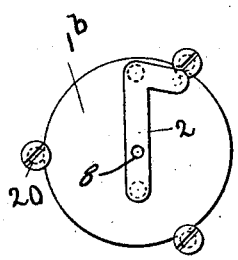
Figure 5:
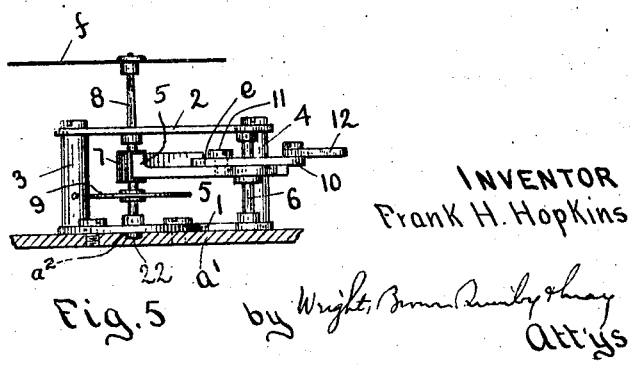
Figure 5 is an elevation of the entire movement in connection with the back wall of the case, which is shown in section.

In another form shown in Figure 7 the bottom plate 1ᵇ is entirely circular and its radius is greater than the distance of either the post 4 or the staff 6 from the center staff 8. Screws in any desired number are set to overlap the rim or lip of the plate. Evidently here the adjustment may be continued without interference and without need of shifting the screws throughout an entire revolution. It may be noted that in any case, whether the screws pass through slots or merely overlap the rim of the plate, the plate has a lip or lips which will overlap and engage with the heads of the clamping screws.

What I claim and desire to secure by Letters Patent is:

1. A pressure gauge comprising, in combination with a case and a Bourdon tube mounted operatively in said case, a self-contained indicating movement including a frame, an indicator staff rotatably mounted in said frame and motion transmitting means from said staff adapted to be connected with said Bourdon tube, said movement as a whole being mounted in the case with provision for angular movement about the axis of said staff.

2. The pressure gauge combination as set forth in claim 1 and in which the said movement frame is provided with a curved lip concentric with said axis, and a clamp member is mounted on the case and constructed and arranged to overlap and clamp said lip.

3. A pressure gauge as set forth in claim 1 in which the movement frame includes a bottom frame plate having a lip concentric with said axis and the case has a back wall against which said frame plate lies; the plate and back wall having complemental pivot and socket elements in the line of said axis, about which the rotary adjustment of the movement takes place, combined with a clamp device fixed to the back wall and overlapping said lip.

4. In a gauge a case having a back wall with one member of a swivel coupling, a clamp mounted on said wall at a given distance from said member adapted to grip and hold the after-named movement plate, and an index-operating movement having a swivel member complemental to that of said wall adapted to be coupled therewith and including a plate having a lip concentric with said swivel coupling, arranged to be overlapped and engaged by said clamp, whereby the movement may be adjusted angularly about the swivel coupling and made fast in various positions of adjustment to accommodate spring tubes of various lengths.

5. A pressure gauge comprising a case, a Bourdon tube and an indicator operating movement consisting of a frame, an indicator staff, and means adapted to be coupled to said Bourdon tube and arranged to transmit movement therefrom to said staff, combined with means for mounting said movement with provision for adjustment angularly about a given center to accommodate Bourdon tubes of different lengths in the same case.

6. A pressure gauge comprising a case, a movement including a frame and a center staff, and a swivel connection between the case and movement consisting of a projection extending from the latter in alinement with the center staff, and a socket or recess in a wall of the case wherein said projection fits rotatably.

7. In a pressure gauge the combination of a case, a spring tube and a movement, with attaching screw adapted to secure the movement to a wall of the case, said movement including a rotatable center staff and a bottom plate having an arcuate slot concentric with said staff through which said attaching screw passes and in which there is an enlargement adapted to pass over the head of said screw, the slot being elsewhere of less width than the greatest width of said screw head.

8. A pressure gauge comprising a circular case having in its rear wall a centrally located socket or recess, a curved spring tube operatively mounted in said case, a movement including a bottom frame plate, complemental frame members and an indicator carrying staff, a bearing sleeve for said staff mounted in the bottom plate and projecting thence into the said socket in which it fits in the manner of a pivot, said bottom plate having a lip concentric with the staff, and a clamp mounted on the gauge wall arranged to overlap said lip for securing the movement in various positions of angular adjustment about the axis of the staff.

In testimony whereof I have affixed my signature.

FRANK H. HOPKINS.